Feb. 16, 1937. H. KÜPPENBENDER 2,070,664
PHOTOELECTRIC EXPOSURE METER
Filed Jan. 23, 1936

Inventor:
Heinz Küppenbender
by B. Singer
Attorney

Patented Feb. 16, 1937

2,070,664

UNITED STATES PATENT OFFICE 2,070,664

PHOTOELECTRIC EXPOSURE METER

Heinz Küppenbender, Dresden, Germany, assignor to Zeiss Ikon Aktiengesellschaft, Dresden, Germany Application January 23, 1936, Serial No. 60,377
In Germany January 11, 1935

2 Claims. (Cl. 88—23)

This invention relates to improvement in photoelectric exposure meters and particularly relates so that type of an exposure meter in which a variable electric resistance is used to influence the position of the pointer of an electric measuring instrument. In exposure meters of this type it is required that the pointer be adjusted to point to a fixed mark on the face of the measuring instrument in order to obtain the correct exposure which may be indicated by a scale associated with the variable electric resistance.

It now may happen that due to unfavorable light conditions it is impossible to adjust the resistance so that the pointer moves to the required position, but comes to rest between its zero position and the said fixed mark to which it should be moved. If this happens the direct determination of the correct exposure time is not possible.

It is now an object of the present invention to overcome this disadvantage of the photoelectric exposure meter and to improve and enlarge its range of application so that it can be used under practically all light conditions. For this purpose the present invention provides a portion of the visible dial of the measuring instrument, namely a portion between the zero position and the fixed indicating mark with a scale. Each scale division is provided with a number which indicates the number by which the reading on the time scale has to be multiplied in order to obtain the correct exposure time.

The drawing shows by way of example one embodiment of the invention.

Figure 1:
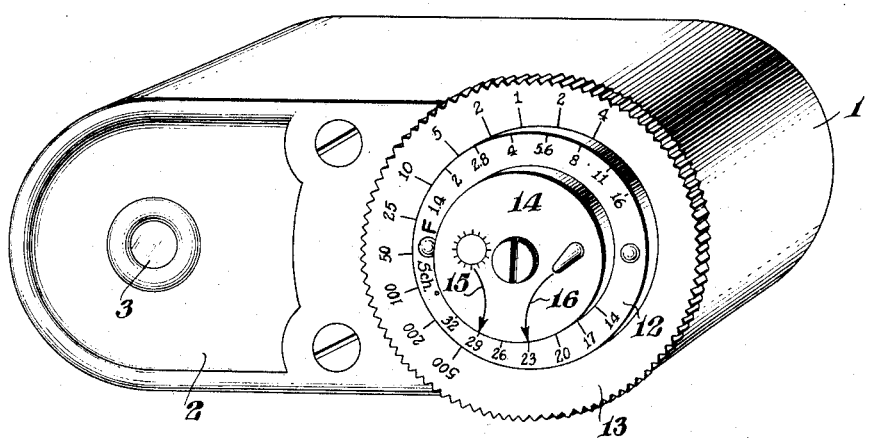
Fig. 1 is a perspective view of the photoelectric exposure meter.
Figure 2:
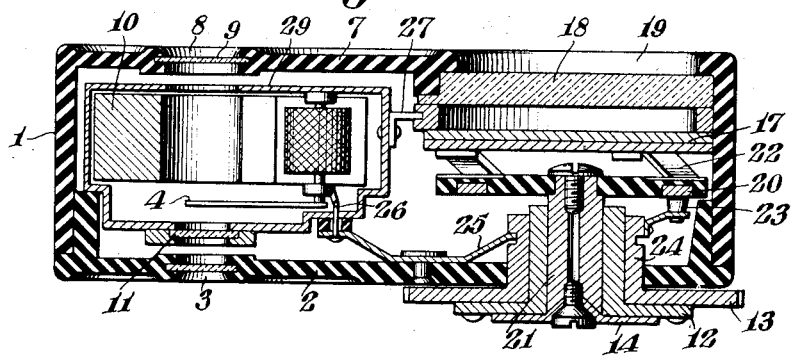
Fig. 2 is a horizontal sectional view of the same.
Figure 3:
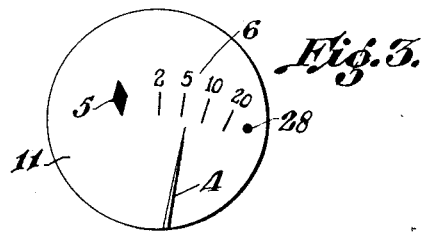
Fig. 3 shows in an enlarged scale the visible portion of the indicating face of the measuring instrument.

In the drawing, the casing 1 of the photoelectric exposure meter is made of insulating material and its cover 2 is provided with an observation opening 3 for observing the pointer 4 of the measuring instrument 10, which in the present case consists of a moving-coil instrument. The visible portion of the scale plate 11 of the measuring instrument 10 is provided with a fixed mark 5 and a scale 6. The scale divisions are each provided with a number, in the present instance with the numbers 2, 5, 10 and 20. The zero position of the pointer 4 is indicated at 28 (Fig. 3). The scale plate 11 is transparent and the rear wall 7 of the casing 1 is provided with an opening 8 closed by a transparent glass plate 9 to permit a convenient reading of the measuring instrument when looking into the opening 3, while the exposure meter faces the object or scene to be photographed.

Several rotatable members 12, 13, 14 are mounted concentrically with respect to each other on the cover 2. These members are provided with various indications required for the determination of the correct exposure time. The member 12 has a scale indicating the various diaphragm openings of the camera and another scale indicating the various film speeds, for instance in Scheiner degrees. The member 13 has a scale which indicates various exposure times. This scale cooperates with the diaphragm scale of member 12. The member 14 is provided with two arrows 15 and 16, cooperating with the film speed scale of member 12. The arrow 15 indicates day light and as shown may have associated therewith a picture of the sun, while the arrow 16 indicates artificial light and may have associated therewith the picture of an electric light bulb as shown.

A photoelectric cell 17 is arranged laterally of the measuring instrument 10 and behind a transparent glass plate 18 closing an opening 19 in the rear wall 7 of the casing 1. Between the cover 2 and the photoelectric cell 17 is arranged an electric resistance 20 which is fixedly mounted on the inner end of a shaft 21 which carries on its outer end the member 14. The resistance 20 is conductively connected with one electrode of the photoelectric cell 17 by contact 22. This resistance 20 is also in engagement with a slidable contact 23 which is secured to a tubular extension 24 of the rotatable member 13 and rotates with the latter to vary the resistance. The tubular extension 24 is in slidable engagement with one end of a contact 25 which is secured to the inner face of the cover 2 and whose other end leads to one terminal 26 of the measuring instrument 10. The casing 29 of the measuring instrument which forms the other terminal of the latter is connected with the other electrode of the photoelectric cell 17 by a contact 27, whereby the electric circuit is completed.

The operation of the photoelectric exposure meter is as follows:

According to the example illustrated in the drawing, the film speed of 23° Scheiner is opposite the arrow 16 indicating artificial light. If it is desired to use a diaphragm opening No. 4 the exposure time indicated would be one second provided the pointer 4 of the measuring instrument 10 is opposite the mark 5. Since this, however, is not the case (see Fig. 3) a slight correction is required. It will be noted that the pointer 4 is opposite the scale division "5" and this means that the exposure time indicated at the rotatable member 13, namely one second, has to be multiplied by five, giving a correct exposure time of five seconds.

What I claim as my invention is:

1. In a photoelectric exposure meter, the combination of a photoelectric cell, an electrical measuring instrument having an indicating face and a pointer, a variable resistance adjustable for bringing said pointer opposite a fixed mark on said indicating face, means for adjusting said resistance, said means having indications of the exposure time, and a numerical scale on said indicating face and disposed between a zero mark on said indicating face and said fixed mark, the numbers on said scale representing numbers by which the exposure time indications are to be multiplied to obtain the correct exposure time when the photocell conditions are such that the pointer cannot be advanced to said fixed mark, the numerical values of the scale numbers being highest adjacent said zero mark and decreasing toward said fixed mark.

2. In a photoelectric exposure meter, the combination of a photoelectric cell, an electric measuring instrument provided with an indicating face having a zero mark and spaced therefrom another fixed mark thereon, and a movable pointer; a variable resistance adjustable for moving the pointer toward and opposite said fixed mark on said indicating face, a numerical scale on said indicating face between said zero mark and said fixed mark, the numbers on said scale representing numbers by which the exposure time indications as indicated by the position of the variable resistance have to be multiplied to obtain the correct exposure time when the photocell conditions are such that the pointer cannot be advanced to said fixed mark, the numerical values of said scale being highest toward said zero mark and decreasing toward said fixed mark, a rotatable member for adjusting said resistance, an annular flange on said rotatable member provided on its outer face with a scale indicating exposure times, and an annular member arranged concentric with respect to said rotatable member and provided with a diaphragm scale opposite said exposure time scale.

HEINZ KÜPPENBENDER.